United States Patent [19]

Scott

[11] E Re. 29,945

[45] Reissued Mar. 27, 1979

[54] MULTIPLE USE CONCRETE FORM LINER

[76] Inventor: Sam C. Scott, 2519 Walnut St., Denver, Colo. 80205

[21] Appl. No.: 681,153

[22] Filed: Apr. 28, 1976

Related U.S. Patent Documents

Reissue of:

[64] Patent No.: 3,759,481
Issued: Sep. 18, 1973
Appl. No.: 215,370
Filed: Jan. 4, 1972

U.S. Applications:

[63] Continuation-in-part of Ser. No. 17,423, Mar. 9, 1970, abandoned.

[51] Int. Cl.[2] ..... E04G 9/10; B28B 7/36

[52] U.S. Cl. ..... 249/80; 249/16; 249/78; 249/112; 249/189

[58] Field of Search ..... 249/113, 114, 134, 189

[56] References Cited

U.S. PATENT DOCUMENTS

| | | | |
|---|---|---|---|
| 2,964,800 | 12/1960 | Dorsett | 249/16 X |
| 3,088,753 | 5/1963 | Sendor | 249/114 X |
| 3,185,432 | 5/1965 | Hager | 249/78 |
| 3,245,648 | 4/1966 | Johansson | 249/134 |
| 3,381,929 | 5/1968 | Bancker | 249/189 X |
| 3,428,725 | 2/1969 | Delmonte | 264/338 X |
| 3,602,476 | 8/1971 | Iragorri | 249/15 |
| 3,615,071 | 10/1971 | Harper | 249/112 |
| 3,617,369 | 11/1971 | Lombardo | 249/113 |
| 3,650,795 | 3/1972 | Willingham | 249/134 |

*Primary Examiner*—Richard B. Lazarus
*Assistant Examiner*—John S. Brown

[57] ABSTRACT

A multiple use, flexible, elastomeric liner for forms for concrete faced walls prepared by having a series of rigid panels in side by side relation, includes panels of liners for rigid panels having a concrete contacting face of a flexible, elastomeric synthetic polymer used throughout as a negative mold of a desired design in the finished concrete and having an opposed planar surface for face engagement with the form panels. The liner panels will not support the concrete for the wall without the backing panels. The elastomeric liner is a soft, flexible, resilient, elastomeric synthetic polymeric material which permits sharp relief designs having undercuts, and in edge engagement with similar panels squeeze together for a seamless surface in the completed concrete while leaving the impression of itself in exact detail in the hardened concrete.

9 Claims, 6 Drawing Figures

MULTIPLE USE CONCRETE FORM LINER

Matter enclosed in heavy brackets [ ] appears in the original patent but forms no part of this reissue specification; matter printed in italics indicates the additions made by reissue.

This application is a *reissue of Pat. No. 3,759,481 and a* continuation-in-part of copending application Ser. No. 17,423, filed Mar. 9, 1970, and now abandoned, for Flexible Liner for Concrete Forms.

Concrete forms, particularly for walls, partitions and the like, conventionally use rectangular panels of plywood, steel sheets, planks, and the like, supported by various types of reinforcing and support members. When two or more of these panels are attached together in planar alignment the form "in-total" is called a gang form and is usually stripped from hardened concrete as one piece rather than two or more smaller pieces. The panels are generally held in side by side relation, mounted on supporting structure, and generally two series of such panels are mounted in generally parallel, spaced apart, face-to-face relation so that concrete may be poured between the two to eventually form the rectangular wall or partition. Plywood panels for such forms are generally 2 × 8 ft., or more commonly 4 × 8 ft. sheets. With the steel sheets, they are usually formed in 2-ft. widths mounted on the supporting structure for holding such panels in position for pouring a wall or partition. To keep the walls of the forms substantially parallel under the weight of the concrete poured between them, ties of wires, rods, or other material are fastened, through the space into which the concrete is poured, from wall to wall, leaving the intervening wire or rod imbedded in the finished concrete. This, of course, requires apertures or holes in the forms for the ties.

When the forms are made of plywood, the panels are generally coated with oil as a parting agent and in an attempt to prevent the penetration of the cement-loaded water into the wood of the panel. Long experience has shown that such plywood panels rarely last more than four pours, particularly since the corners and edges are easily damaged in the erection, shipping and storing of the panels. In the reinforcing steel installation in the forms, numerous gouges and scratches are inflicted on the plywood from the sharp edges of the reinforcing bars and wire. The steel forms have a somewhat better life; however, they are quite heavy and are easily bent and dented in the erection, storage and/or transportation, so that after a few uses the panels can not make good joints with adjacent panels and the resulting concrete shows extruded joining lines and offset joints. With the plywood panels, cement water draining from the concrete enters the cracks of the joints and any damaged surface areas of the panels and enters the plywood itself, causing deterioration of the plywood and warping of the plywood. After both the plywood panels and steel panels have had several uses, the joints between the panels become poorer and poorer and alignment becomes a definite problem. The produced concrete includes protruding and non-aligned joints, which is particularly noticeable where there is warping of the plywood panels and bending of the steel panels. The surface of the finished concrete assumes the surface of the form, which is equivalent to a negative mold, and the surface of the finished concrete is generally from rough to smooth and includes all the blemishes of the panel formed in the concrete.

According to the present invention, there is provided a flexible, resilient form liner made of an elastomeric, synthetic polymeric material, which is castable or moldable and is easily fastened to the panels of the concrete form. The liner has a concrete contacting surface of a desired design. The resilient material of the lining is sufficiently soft to squeeze on adjacent liners under the weight of the wet concrete in the form, closing the joint lines between the liners so that the finished concrete does not show joint lines. The liners are readily attached to existing forms, or the existing forms are easily modified to accept the liner. Depending on the nature of the attaching method chosen the elastomeric liners can be released from the concrete still attached to the form panel itself or they can be peeled after the form panel has been pulled and then reapplied to the panel ready for the next pour of concrete. The form lining is readily placed on the form panels with simple and varied means of holding the liners on the form panels. After the concrete has cured, the liners are easily peeled or released from the concrete even with deep, base relief features including undercuts. The material is soft enough to readily free itself, without damage to the concrete, from the features of the design including the undercuts, and it is sufficiently strong so as to not tear in the removal process and therefore may be used over and over. The elastomeric liner has a hardness sufficient to retain its design shape even under the weight of the concrete when the concrete is placed either vertically or horizontally. A definite advantage of the flexible, resilient liners is that the face of the liners provides a negative elastomeric mold of the desired wall design which may be of native rock, stone, striated wood, geometric or random patterns or any form desired. While the liner is quite soft, flexible and resilient, it is tough enough to maintain its integrity under the weight of the concrete in the concrete form. It is sufficiently soft and flexible to squeeze against an adjoining flexible liner to close the joints between the liner sections. This prevents water from seeping through the liners, and retains the concrete within the form itself. The liners are useful over a long life, and it is not unusual to have the form panels last as long as the liners, which may range from 100 to 150 or more re-uses. Also, in using the liners, it is preferable that the joint lines of the liners do not match the joint lines of the form panels, so that the joints of the liners are backed on a smooth surface of the form panel. It is sometimes desirable to use a form release coating to help the liners in the removing process.

The liners may be attached by any suitable means to the form panels. The choice of fastening means is determined by the composition of the form panel itself, the thickness of the liner, and the design in the negative mold side of the liner. The process of making the form liners is, precast, site cast, poured in place, etc. Among the various forms of attachment are lugs extending from the planar surface of the liner to extend through the concrete form panels, and these lugs are held in any convenient way. The lugs provide a means for sighting along a series of such panels for correct alignment and to produce a very uniform wall. The liners may, also, be nailed, stapled, cemented, or otherwise attached to the form panels.

The elastomeric synthetic polymer liners are inert to the chemicals of the concrete, whether the concrete is a conventional concrete or some of the new exotic concretes having various ingredients for various hardening and fast setting purposes. This is obviously an improvement over rubber, or similar materials. The liner may be used in the concrete form with high cycle vibrators to muddle the concrete in the forms without damage to the liner or to the form. This allows very fine surface detail in the hardened concrete surface while eliminating much of the air entrapment generally associated with poured concrete. The elastomeric polymer liner is not damaged if the high cycle vibrator accidentally touches it in the vibrating process. The liner is soft enough so that a slit in a liner permits the passage of the tie wire or rod, and the elastomeric polymeric plastic liner seals back around the tie in a gasketing action to form an excellent surface at the intersection of the tie with the finished concrete. Furthermore, the slits do not need to be filled or otherwise closed in subsequent re-use where there is no tie passing through the slit. The soft material squeezes together sealing the opening and thereby permits re-use of the form in different positions on concrete forms and with different positioning of the ties which pass through the liner.

It is, therefore, among the objects and advantages of the invention to provide an elastomeric lining system for concrete forms which produce a fine detail of predetermined design in the surface of finished poured concrete and also increases the life of the supporting concrete forms.

Another object of the invention is to provide a flexible, resilient concrete form liner made of a synthetic plastic, elastomeric polymer which does not readily adhere to the concrete and is sufficiently soft to be readily stripped from the form including the undercuts of the design of the mold without damage to the resulting concrete surface or itself.

A still further object of the invention is to provide a concrete form liner which provides a negative elastomeric concrete-contacting face mold with a predetermined pattern to produce a fine detail design in the resultant surface of the concrete structure.

These and other objects and advantages of the invention may be readily ascertained by referring to the following description and appended illustrations in which.

Figure 1:
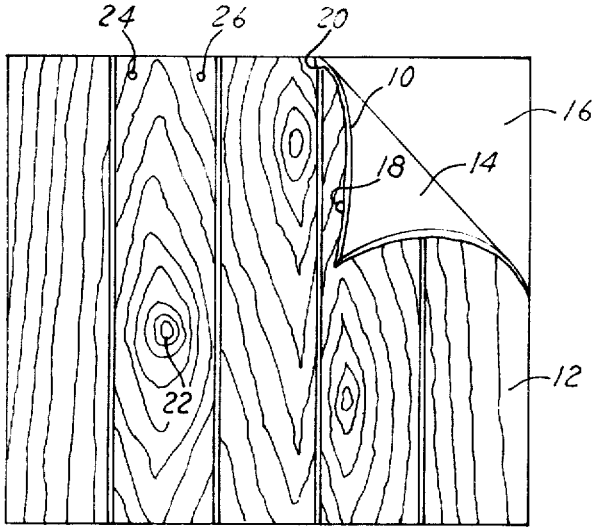
FIG. 1 is a front elevational view of a portion of the concrete form liner according to the invention positioned against a concrete form panel with a corner folded back.
Figure 5:
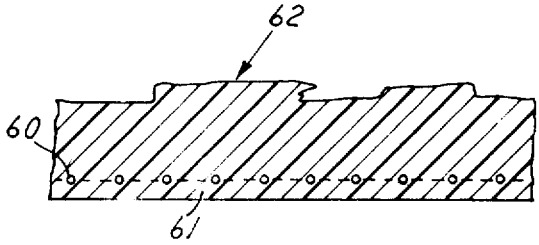
FIG. 5 is a cross sectional view of a form liner according to the invention illustrating a longitudinal stabilizing member imbedded in the liner itself to reduce expansion and contraction without disturbing the elastomeric engaging face.

An elastomeric concrete form liner, according to the invention, may be made of a soft, flexible, resilient, elastomeric synthetic polymeric material and may include such materials as [polyvinyl resins,] silicone resins, polyethylene resins, polypropylene resins, [various vinyl copolymers, polytetrofloro] *polytetrafluoro* alkalines, polyesters, polyethers, and such similar synthetic resins; the hydrocarbon resins being generally considered saturated. A preferred type of resin is a polyurethane resin which is provided with a particular chain linkage in its chemistry to maintain the dense polyurethane soft, resilient, elastomeric and tough. The synthetic resin liner is manufactured by casting or molding in shallow, planar molds, usually having a minimum thickness of at least about ⅛ inch of liner to a thickness in excess of 4 or 6 or more inches. Since the liner is a negative mold for a desired configuration of surface, the thickness of the liner may vary throughout the extent of the panel from a minimum thickness to the maximum which represents the height between the lowest depression and the highest elevation of the base relief of the finished concrete. To provide for a fine detail base relief of the finished surface, the liner must be flexible enough to permit undercuts in the finished concrete whereby the liner may be pulled from the base relief without breaking the concrete and without tearing the liner itself. Concrete has a tendency to shrink as it sets and the stretchable liner still strips easily. It has been determined that a material having a Shore A [ASTM hardness method D2240] of from [10 to 80, with a preferred range of] 35 to 70, will have the desired softness and flexibility for the liner. Below Shore A [10] *35* the material is too soft to maintain its integrity under the weight of the concrete. This soft material flattens out and will not give a reasonable or commercial reproduction of the desired design. Above Shore A [80] *70* the material is too hard, losing its elasticity and flex, and attempted removal from the concrete surface will break the desired surface of the concrete at undercuts, destroying the effect of the desired base relief, and also may damage the liner. The material should have a tensile modulus of between 150 and 2,000 psi at 100 percent elongation [ASTM method at 23° C. D412]. The elongation at the same ASTM method D412 should run from 100 to 175 percent at 23° C., providing for the flexibility necessary to perform as a negative mold for multiple use. The material having a tear strength in excess of 20 pounds per square inch [ASTM method D624 Die C at 23° C.] prevents the rupture of material being removed from the concrete product. The flexible, synthetic polymeric plastic should have a tensile strength in excess of 100 pounds per square inch [ASTM method D412 at 23° C.] to provide a material which will maintain its integrity during the concrete pour and removal from the concrete surface. Concrete contains considerable amount of sand and gravel and sharp aggregate, and the plastic should have a high abrasion resistance so that it does not scratch or tear under the concrete pour into the mold, and does not readily tear during erection or placement of reinforcing steel. The Taber Abrasion test using 1,000 grams, 1,000 cycles H-22 wheels, shows allowable loss from of frm 0.10 grams to 1.5 grams.

The above properties define a soft, flexible, resilient, elastomeric material completely differentiated from the [rigid] lining materials used to date. The liners show a commercial improvement in concreting not before used to attain the dramatic results obtainable with the invention.

The liners of the invention are useful for concrete forms which may be formed for walls, partitions and the like in which a concrete form is made of a plurality of side by side panels of such materials as plywood, steel and the like. Such concrete forms are useful for pre-cast concrete products, or for concrete products cast in situ, and they may include such pre-cast products as columns, beams, panels, various wall structures and the like, and may be formed as castings for ceilings, floors and the like. The configuration, therefore, of the concrete mold in which the lining is to be used is determined by the use for which the particular structure is to be used. In the casting of concrete structures, it frequently occurs that the forms for the particular article are quite large (gang form) and the lining of the invention is highly useful and economical because it can be made in large sizes to form the particular gang form without any jointing and to minimize labor and handling at job site. The liners may be made in relatively small standard panels to line the forms for the finished articles. Thus, while the illustrations are directed to a liner for planar concrete forms, particularly upright walls, the concept of the use of the liner is not limited to any concrete form but it is contemplated that the liner may be used in any type of form for concrete or other cementous material which sets or hardens with standing at ambient temperatures.

To obtain a simulated pattern in the set concrete, so as to make the concrete appear in the shape of the simulated material and not requiring any further finishing other than perhaps painting, the concrete contacting face must be a soft, flexible, resilient, elastomeric synthetic polymeric plastic liner. A polymeric material which has Shore A hardness of [10–80] *35–70*, an elongation of 100–1,000% and tear strength in excess of 20 pounds per *square* inch is satisfactory for the liner.

The liner panel for the form of FIG. 1 illustrates a liner for forming a simulated barnwood [weathered wood] concrete wall. This concrete wall will have the appearance, particularly when painted, of that of a wall formed of weathered boards, without the maintenance that would be required of real barnwood, etc. A liner 10 formed of soft, resilient, flexible elastomeric synthetic polymeric plastic 10 is arranged with a face 12 formed as a negative elastomeric mold of the desired configuration and a planar surface face 14 which is arranged to lie in face engagement with a concrete form panel 16. In the liner illustrated in FIG. 1, the panel of the liner includes raised portions 18 and 20 which form depressions or lines simulating an open joint between boards in the finished concrete. Also, included are simulated knot holes 22 and various raised grain in the boards actually simulating the surface effect of barnwood. The surface may include circular depressions 24, 26, for example, which produce slight knobs on the finished concrete surface indicating nail heads such as might be found in old barnwood. The undercutting is obviously a tremendous asset to the total "look" of the finished concrete.

The liner is formed by casting or molding or curing liquid polyurethane precursors, or other suitable precursors for synthetic polymers, in a shallow planar mold which has the positive of the desired design in the bottom of the mold. The mold for the liner may be elastomeric itself so as to further enhance the detail obtainable. It may, also, be of a rigid material such as set concrete or aluminum, etc., and may use external or interior heating sources to accelerate the chemical action that cures the elastomeric liner material into a tough elastomeric sheet. The polyurethanes are generally poly-functional long chain alcohols with a plurality of hydroxyl groups reacted with a polyisocyanate. The polyurethanes themselves are esters of dicarbamic acids and glycols, or inter-molecular esters of gamma-hydroxic carbamic acids. The polyurethane elastomers are made from diisocyanates, aliphatic polyesters, etc. Several types of polyurethanes are commercially available as 2 part pourable liquids, which have a good shelf life and are easily mixed with the necessary polymerizing or curing agent. One form is a polyester made from ethylene and propylene glycols with adipic acid. A curing agent such as toluene, naphthylene or diphenylmethane diisocyanates may be used. The resultant polymer should have the hardness, tensile modulus, elongation, tear strength, tensile strength and abrasion resistance in the ranges set forth above for forming the liner of invention. One of the specific liners manufactured by the assignee at present invention [is called "Red Flex", which is a colored polyvinyl plastisol which has a Shore A hardness of 47–32, tensile modulus of 175–368, elongation of 820–460 percent, a tear strength of 62–102 and a tensile strength of 810–1,200. Another specific liner] is a polyurethane called "Flexliner" having a Shore A hardness of 53–56, a tensile modulus of 212–234 *psi*, an elongation of 270–300% tear strength of 67–73 *psi* and a tensile strength of 504–563 *psi*.

Figure 2:
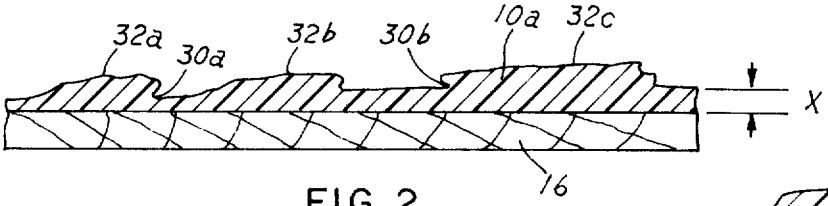
FIG. 2 is a cross sectional detailed view of a form liner according to the invention temporarily sealed on a portion of a concrete form panel.

In many base relief designs which may be desired, an uncercut in the finished product is necessary to give the fine detail desired. As shown in FIG. 2, a liner 10a includes a series of undercuts 30a, 30b, as well as elevated lands, 32a, 32b and 32c. The liner 10a is attached by any convenient means to a concrete form panel 16. The thickness x which is the minimum thickness of any portion of the liner should be at least about ⅛ inches which will provide the liner with sufficient integrity to maintain its strength in its thinnest sections. It is noted that the higher lands produce a substantial thickness of the liner. Various types of base relief may include portions of the liner which exceed a thickness of 4, 6 or more inches, again depending on the type of base relief which is desired in the finished concrete. It is obvious that the elastomeric liner may be smooth with no detail on the concrete contacting face. This allows the user to take advantage of many of its benefits such as non-absorbing of cement water, gasketing at tie holes, lining curved or odd-shaped forms, insulating, etc. These qualities all contribute to a smooth, well-cured and unstreaked concrete wall or floor. Until now only rigid type liners have been commerically available. The invention attains a high level of sophistication and versatility in concreting.

Figure 3:
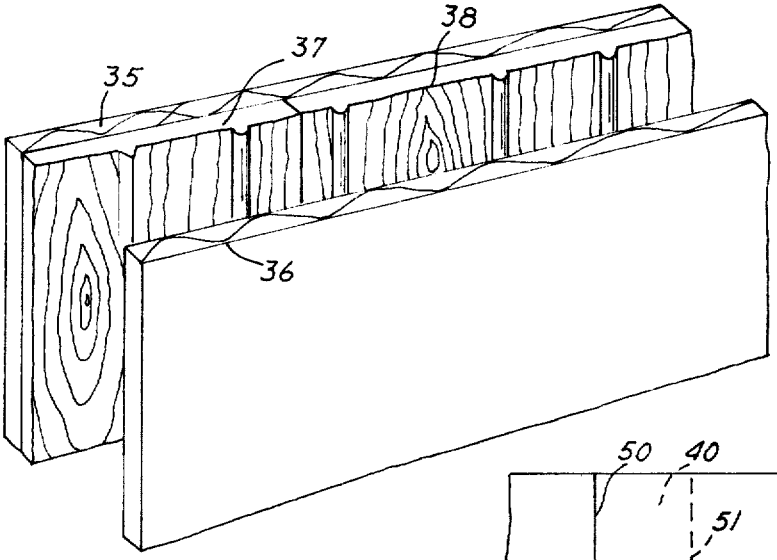
FIG. 3 is a detailed view of the portion of a wall form showing the positioning of the liner according to the invention in a concrete form for a wall.
Figure 4:
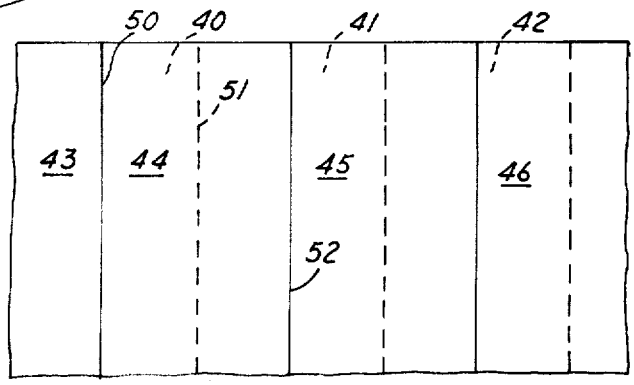
FIG. 4 is a plan view of a concrete form liner section according to the invention illustrating the positioning of liners on concrete form panels.

In using the form of the invention, as shown in FIG. 3, a pair of concrete form panels 35 and 36 are arranged in parallel spaced relation to each other, and a pair of liners 37 and 38 are shown secured to panel 35 with the negative elastomeric face mold section facing inwardly of the parallel concrete forms to produce, on the face adjacent to panel 35, the positive of the desired base relief configuration. As is well known, in the concrete wall construction the panels of the concrete form are held in parallel position by a plurality of ties which may be wire, rod, or the like, which extend through both of the parallel concrete panels and are imbedded in the finished concrete. To remove the concrete forms from the finished concrete the ties must be cut to permit the removal of the form from the cured concrete. Furthermore, to permit the ties to pass through the concrete forms, holes must be formed in the form that are big enough to allow passage of the head of the tie, which has a greater circumference than does the shank or tie itself. This, of course, permits concrete-laden water and some of the concrete itself to ooze out of the holes if they are not packed or gasketed from the outside of the form itself. Visual inspection of conventionally formed concrete walls shows just how unsatisfactory this can be. With applicant's soft, resilient liner, however, the ties may be merely passed through slits which stretch to accomodate the tie head, formed in the liner at the necessary locations. The material of the liner itself will squeeze down on the shank of the tie preventing any oozing of concrete or water through the opening through which the tie passes. This forms a very smooth joint for the concrete form tie. In addition, when the form is used in the next location on a different wall form, a tie does not necessarily have to pass through the same slits, since the material will squeeze on itself sealing the slits, causing no blemish on the finished concrete surface.

Preferably, the liners are arranged in abutting position on the concrete forms with their joints in the middle of the form panel rather than on the joints of the form panel to provide a good backing for the liner joints. This is desirable, but not essential. Since the liner itself will not support the heavy concrete which is poured therein, misalignment of the joints of the concrete forms will be covered by the liner. As shown in FIG. 3, a series of three concrete form panels 40, 41 and 42 are arranged in side by side abutting position, and liner panels 43, 44, 45 and 46 are arranged thereon. The abutting joints between each of the liner panels are in the middle of the concrete panels rather than on the joint lines. Thus the joint 50 between panels 43 and 44 are in the middle of panel 40 rather than on the joint 51 between concrete panel 40 and 41. In a similar manner joint 52 between the liner panels 44 and 45 are in the middle of panel 41. This provides good backing for the edge abutting joints of the panels. As pointed out above, the material is sufficiently soft that it squeezes together completely closing the joint and forming a seamless surface of the finished concrete. It is obvious that the elastomeric liners can be placed with joints abutting over joints in the form but good concreting practices dictate the system detailed herein.

As shown by the physical properties of the desired concrete form liner sheets the synthetic polymer plastic material is soft, flexible, and resilient, to allow for the fine detail obtainable from poured concrete and yet be easily stripped. It is known that all elastomeric materials have coefficients of liner expansion and contraction under conditions of heat and cold. The synthetic polymeric liner may be stabilized so as to control this effect in applications where it is required for good results. It is obvious that a steam-heated precast bed can attain temperature approaching 200° F. Concrete itself can approach 140° F. as it takes its set. In summertime or hot weather concreting, this heat generation plus the hydration process plus the ambient temperature can generate higher temperatures in the concrete against the plymeric liner itself. By imbedding a perforated sheet, screen, cloth or film into the liner at the time of manufacture (before the precursors change from a liquid to an elastomer sheet) a plane of stabilization can be added to the liner. When a perforated sheet is used, the perforations act as individual stabilizing points, usually 1 inch on center throughout the entire planar surface of the elastomeric liner. Since the elastomeric material either completely surrounds the stabilizing sheet or at least flows to the top of each perforation and bonds totally to the entire sheet, the elastomeric face engagement side of the liner is not affected and will still stretch and bend and flex from detail and undercuts on set concrete. The tie holes are still slit in the surface but the imbedded stabilizing sheet must be drilled the same circumference as the tie head for it to pass through, but the liner slit still stretches and closes on the shank to obtain the gasketing action. It is preferred to use as a stabilizing element a material that has a very low coefficient of expansion and contraction as well as a low moisture content, since at elevated temperatures water vapor gas may form during liner curing and expand, causing difiguration and degradation of the element and surrounding elastomeric material. It is obvious that other stabilizers could be imbedded in or glued to the liner providing the same degree of lateral stability when required. Such materials are hardware cloth, glass fiber strands or webs, perforated metal films, perforated plastic films or sheets, screening or the like may be used. Expansion and/or contraction has always been a problem in any concrete form liner since the negative face can be distorted, thus making the concrete surface distorted or out of line, etc. The addition of the lateral stabilizing sheet which is perforated or absorbent (as in glass matting) corrects this deficiency when required in the elastomeric concrete form liner of this invention.

It is known that the liners absorb or reflect radiant or convective heat or cold at different rates. The more heat absorbed the greater expansion, etc. By the addition of a light reflective color "white" to the elastomeric material, the concrete liner becomes itself a reflector of heat. Since reflection will occur the liner itself does not become overly heated, thus reducing expansion or contraction. It is obvious that this is desirable in many instances where the stabilizer sheet is not suitable to the application. Also, both white color and a stabilizer could be used to attain even a greater degree of stability. White or lighter type colors are, also, desirable so the user of the elastomeric liner is more able to see any dirt or refuse that may be on the liner before concrete is placed against it, causing a speckled or dirty appearance on the set concrete surface. It is not common commercial practice to add white pigment to the preferred urethane elastomer. However, because of its inherent heat reflective qualities it is desirable for the addition in the synthetic polymeric liner of invention. It is obvious that other colors may be added for identification of product by both sellers and customers of said liners.

Another important function of the invention is to provide a vapor barrier far superior to plain plywood. Concrete in the curing process must retain most of the original water content of the mix, otherwise the particles of cement will not hydrate and adequately bond together and the concrete will not attain acceptable strength. In hot weather concreting, it is especially important to protect the wet concrete from losing too much moisture. General practice is to have burlap sacks draped over forms after a concrete pour and a worker keeping the sacks and the forms wet with a hose. Evaporation will rob the water from the wet concrete right through the plywood or wood form if this procedure is not followed, and this could be disastrous to the pour. When the concrete form is lined with the elastomeric liner of invention the moisture vapor can not escape from the concrete through the forms. The insulating value of the elastomeric liner is far superior to wood or steel and other currently available thin section rigid concrete form liners. Insulation is needed even in summertime to keep too much heat out of the concrete. In some cases curing blankets are actually thrown over wet concrete to this end. Too much heat obviously causes the evaporation process to increase. For wintertime concreting, the same curing blankets are sometimes thrown over the wet concrete to retain the generated heat therein. The elastomeric liner of invention, being at least ⅛ inch thick at its median thickness, acts as an insulator to hold the heat. If it becomes necessary to actually put heat into the wet concrete to maintain its curing temperature, electrical heating tapes may be imbedded in the elastomeric liner much as the stabilizing sheet is to accomplish this end without affecting the elastomeric concrete contacting face of the liner of invention. Heated, rigid, forms have been used extensively for many years but they are expensive and do not allow for the fine detail and undercutting available in the synthetic polymeric elastomeric liner of invention.

A heating cable or tape, in the form of interconnecting mesh, may form of type of stabilizing sheet within the elastomer liner as it provides the heat source necessary to reverse the heat flow in cold weather concreting. Also, a coolant could be circulated through small tubes imbedded in the liner of invention to help in hot, summertime concreting.

Figure 6:
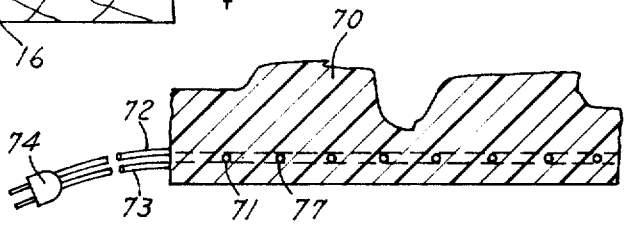
FIG. 6 is a side elevational view of a section of a modified form liner according to the invention.

As shown in FIG. 6, a portion of a liner 70 has electric resistance wires 71 embedded in the plastic material, and power leads 72 and 73 are connected therewith. This provides a heating mat for liner. A plug 74 indicates attachment to a power source. The resistance wires may be replaced by small tubes which form a heat exchange duct through the liner. Through the tubes heating or cooling liquid may be circulated for a desired temperature treatment.

I claim:

1. In combination with large smooth surfaced panels for concrete forms for structural members, a multiple use liner comprising a sheet of soft, flexible, resilient, elastomeric synthetic polymer material which is inert to concrete and having a generally smooth rear surface in face contact with said large smooth surfaced panels, said sheet being formed independently of said panels and supported thereby; the opposite face of said liner having a concrete contacting face formed as a negative mold including undercuts of a desired pattern on the set concrete; said sheeting being at least about ⅛ inch thick at its thinnest section; said sheet having a hardness of from [10–80] *35–70* Shore A, which permits said material to be deformed without damage for releasing from the designs in the set concrete and having an elongation of from 100–1,000 percent at a tensile modulus of from 150–2,000 psi at 100 percent elongation, a [tensile] *tear* strength in excess of 20 pounds per *square* inch, whereby said liner may be removed from a design in set concrete without damage to the concrete including undercuts in the design and said liner squeezes against an adjacent liner under the weight of contained concrete to seal the joint line therebetween and seal around ties or the like passing through the liner.

2. The combination of claim 1 wherein said polymeric material is a polyurethane having a Shore A hardness of about 53–56, tensile modulus of 212–234 *psi*, elongation of 270–300 percent, tear strength of 67–73 *psi* and a tensile strength of 504–563 *psi*.

[3. The combination of claim 1 wherein said polymeric material is a polyvinyl chloride having a Shore A hardness of about 47–32, tensile modulus of about 175–368, elongation of 320–460 percent, a tear strength of 62–102 and a tensile strength of about 810–1,200.]

4. The combination of claim 1 wherein said sheet essentially covers the area of said panels forming a moisture and temperature barrier for concrete thereagainst.

5. The combination of claim 4 wherein said sheet has its full negative mold face in a desired pattern imparting a total simulated look of the desired configuration to a concrete face set thereagainst.

6. The combination of claim 1 wherein said sheet is formed with a light colored pigment as a reflector for heat into and out of concrete in engagement therewith.

7. The combination of claim 1 wherein said sheet is sufficiently soft and sufficiently thick to produce a gasketing effect around a tie passed through a slit therein.

8. The combination of claim 1 wherein said sheet has a heating element imbedded therein for heating contained concrete.

9. The combination of claim 1 wherein said sheet has a heat exchanger tubing imbedded therein for heating or cooling said sheet.

* * * * *